March 29, 1960 W. E. NUPP ET AL 2,930,449
VEHICLE PIT WITH HOIST
Filed Feb. 2, 1959 2 Sheets-Sheet 1
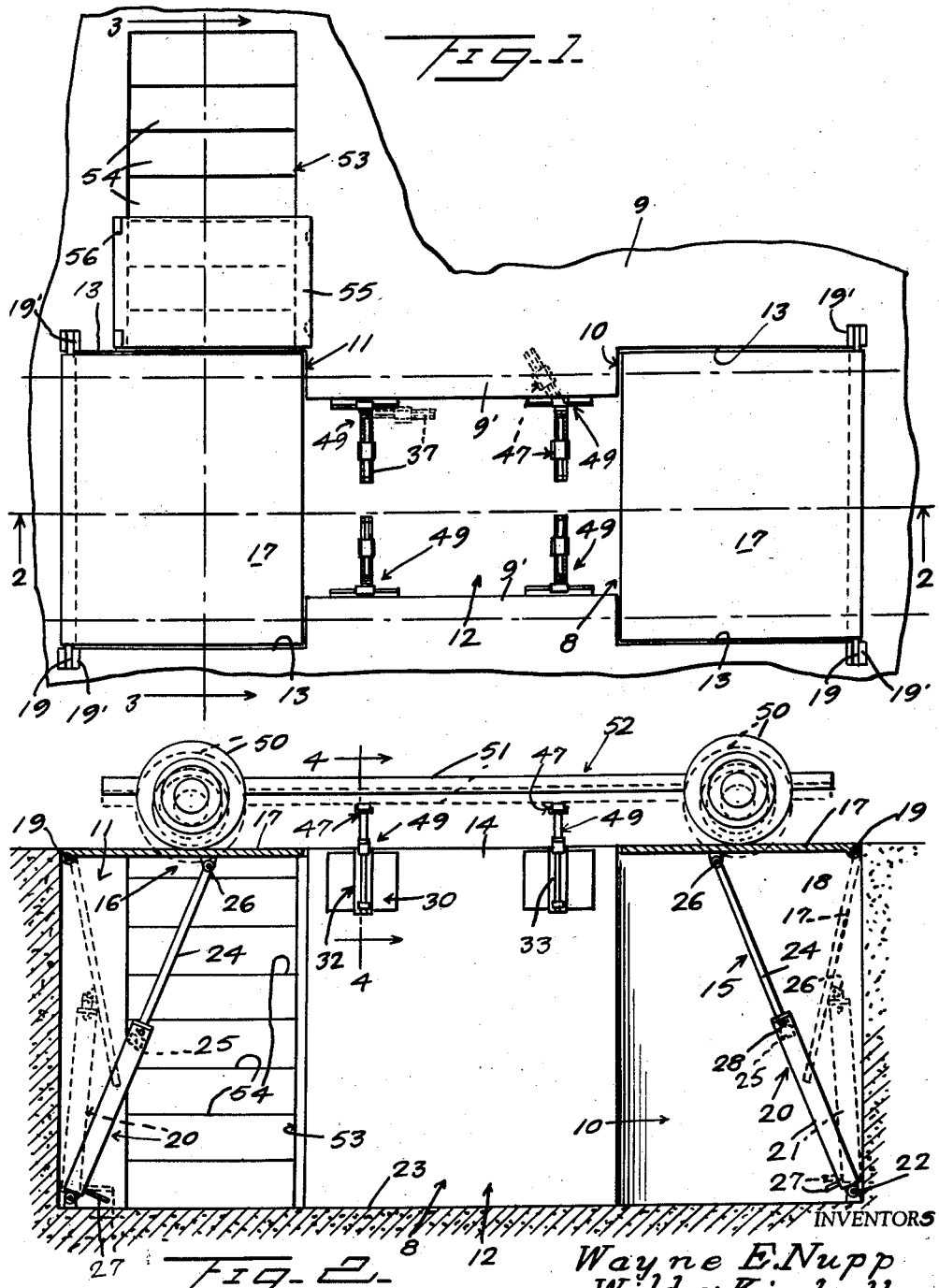
INVENTORS
Wayne E. Nupp
and Wildey Kimball
BY John N. Randolph
ATTORNEY

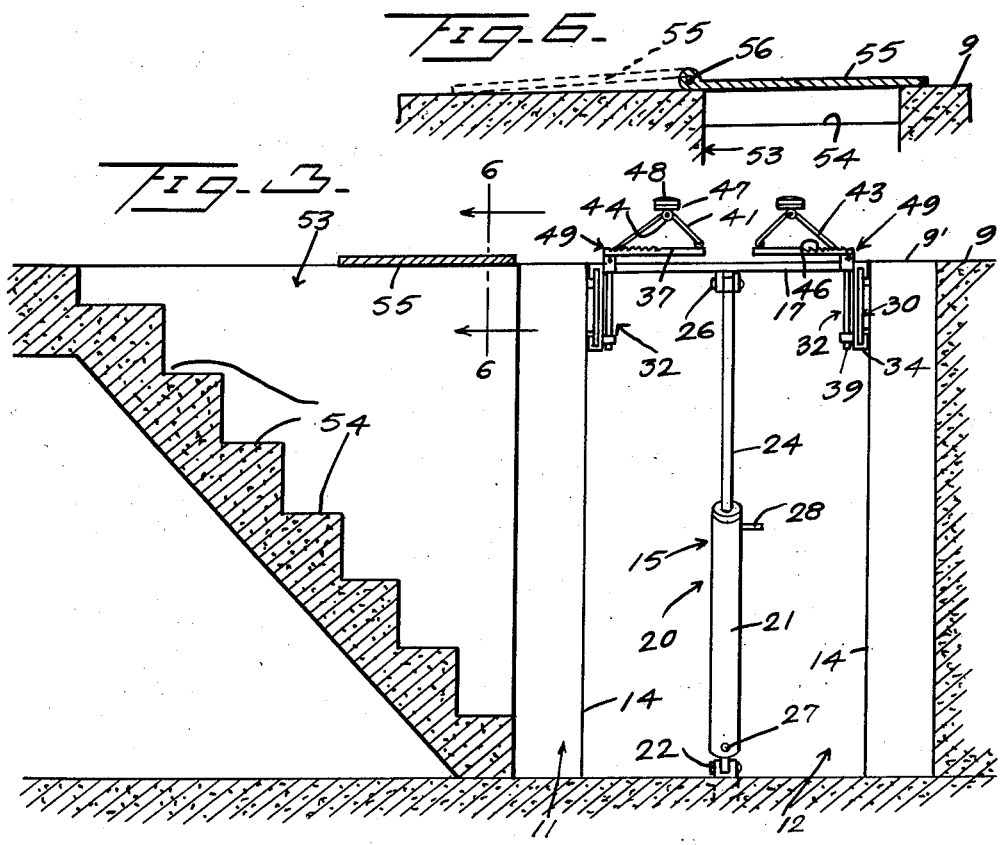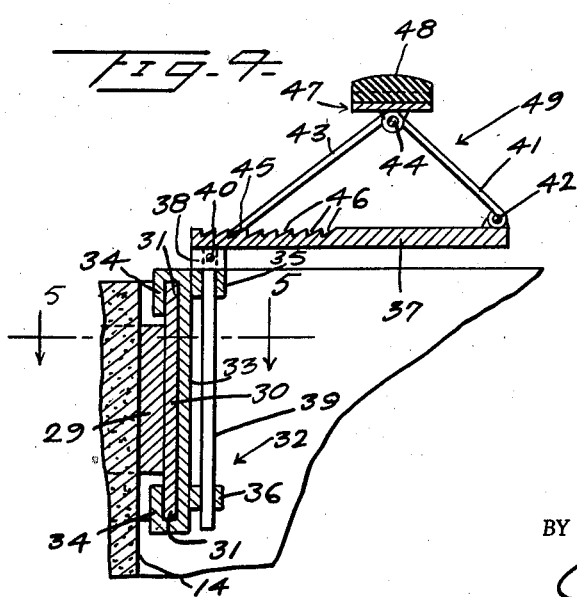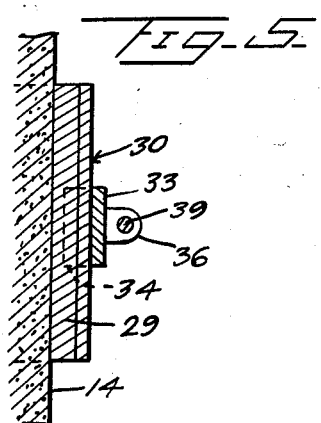

2,930,449

VEHICLE PIT WITH HOIST

Wayne E. Nupp and Wildey Kimball, Tacoma, Wash.

Application February 2, 1959, Serial No. 790,537

7 Claims. (Cl. 187—8.41)

This invention relates to a novel construction of pit adapted to accommodate mechanics while working on wheeled vehicles and more particularly motor vehicles, and has for its primary object to provide a pit of unique construction and shape and which is provided with novel means for supporting the vehicle while over the pit and for raising and lowering the vehicle onto and off of the supporting means.

Another object of the invention is to provide a pit, over which a vehicle can be driven having means to engage and support the vehicle wheels and which means can be lowered for positioning the vehicle frame in engagement with supporting means associated with the pit and on which the vehicle can be supported while being worked upon from within the pit, and with the vehicle wheels free and unsupported.

Still a further object of the invention is to provide a pit and associated hoist and support apparatus by means of which a pit of greater width and length may be provided for affording more ready access to parts of the vehicle to be worked upon from within the pit.

Still a further object of the invention is to provide a pit with vehicle support and hoist means and wherein the vehicle support means can be readily adjusted for engagement with vehicle chassis and frames of various sizes and shapes and which will provide a stable support for the vehicle while over the pit and after lowering of the hoist means for disengagement thereof from the vehicle wheels.

Still a further object of the invention is to provide a apparatus for conveniently supporting a vehicle so that it can be simultaneously worked on from beneath as well as from above.

Various other objects and advantages of the invention will hereinafter become more fully apparent from the following description of the drawings, illustrating a presently preferred embodiment thereof, and wherein:

Figure 1 is a top plan view of the invention, with the hoists in raised positions;

Figure 2 is a longitudinal sectional view thereof, taken substantially along a plane as indicated by the line 2—2 of Figure 1, and showing a portion of a vehicle in position over the pit;

Figure 3 is an enlarged transverse vertical sectional view, taken substantially along a plane as indicated by the line 3—3 of Figure 1, with a part omitted;

Figure 4 is an enlarged fragmentary vertical sectional view, taken substantially along a plane as indicated by the line 4—4 of Figure 2, with the vehicle omitted;

Figure 5 is a fragmentary horizontal sectional view, taken substantially along a plane as indicated by the line 5—5 of Figure 4, and Figure 6 is a fragmentary vertical sectional view, taken substantially along a plane as indicated by the line 6—6 of Figure 3.

Referring more specifically to the drawings, the invention includes a pit, designated generally 8, formed so as to open upwardly through a floor surface 9. The pit 8 is preferably I-shaped, as viewed from above or as seen in Figure 1, and includes end portions 10 and 11 of a width greater than the width of an intermediate portion 12 of said pit 8. Accordingly, the side wall portions 13 of each pit end 10 and 11 are spaced apart a greater distance than the spacing between the side wall portions 14 of the intermediate portion 12 of the pit, and for a purpose which will hereinafter become apparent.

Each pit end 10 and 11 is provided with a hoist, the pit end 10 being provided with a hoist, designated generally 15, and the pit end 11 having a hoist, designated generally 16, and which hoists are of identical construction so that a description of one will suffice for both. Each hoist 15 and 16 includes a strong plate 17 having an outer end provided with a rolled edge 18 through which extends a rigid rod 19. The rod 19 has ends projecting from the ends of the rolled edge 18 and which are journaled in aligned bearing portions 19' formed in the side wall portions 13 of the pit end and at the outer end of said pit end. Each hoist plate 17 extends inwardly of the pit from its hinged end 18 and is of a size to substantially close the open top of the pit end 10 or 11 in which it is mounted, when said plate 17 is in a raised, horizontal position as seen in Figures 1 and 2. However, said hoist plate is capable of free swinging movement within the pit end, as illustrated in full and dotted lines in Figure 2.

Each hoist 15 or 16 additionally includes an extensible power unit, designated generally 20, and which preferably comprises a fluid pressure responsive ram including an elongated cylinder 21 having a closed and sealed lower end which is pivotally mounted by a pivot means 22 at the outer end of said pit end and at or adjacent the pit floor 23. A rigid rod 24 extends slidably through the other end of the cylinder 21 and is fixed at its inner end to a piston 25 which has a close fitting sliding engagement in the cylinder 21. The outer end of the rod 24 is pivotally connected as seen at 26, to the underside of the plate 17 and remote from the hinge axis 19 thereof. Conduits 27 and 28 extend from the lower and upper ends of the cylinder 21 and are adapted to be connected to a suitable source of a fluid medium under pressure for either pressurizing the cylinder below the piston, through the conduit 27, for extending the rod 24, or above the piston through the conduit 28 for retracting the rod 24, as is conventional.

Each of the wall portions 14, as best seen in Figures 4 and 5, is provided with two projections 29 extending inwardly therefrom to each of which is secured a rigid plate 30. Said plates 30 are spaced longitudinally from one another and are spaced inwardly from the wall portions 14 and have top and bottom edge portions 31 disposed above and beneath said members 29, respectively. Each plate 30 supports a bracket 32 including a vertically disposed bar 33 having outwardly turned back upper and lower ends forming hooks 34 which engage loosely around the upper and lower edge portions 31 of the plate 30 for slidably mounting the bracket 32 on said plate 30 for movement lengthwise of the pit 8. Each bracket 32 includes an upper bearing 35 and a lower bearing 36. The bearings 35 and 36 are fixed to and extend inwardly from the bar 33 and are disposed in vertical alignment with one another.

A strong rigid arm 37 has a depending socket 38 at one end thereof which is suitably secured to its underside. An upper end of a rod 39 is secured in the socket 38 by a setscrew 40. The rod 39 is journaled in the bearings 35 and 36 and the socket 38 swivelly bears on the upper side of the upper bearing 35. One end of a bar 41 is pivotally connected by a pivot means 42 to the upper side of the other end of the arm 37 for swinging movement vertically and in a direction lengthwise of said arm 37. A bar 43 has one end pivotally connected by a pivot 44 to the other end of the bar 41, and said bar 43 extends downwardly from the pivot 44 in a direction away from the bar 41 and has an opposite free end 45. A portion of the upper side of the arm 37, disposed remote from the pivot 42, is provided with a series of ratchet teeth 46 all of which include an inwardly facing vertical shoulder. The bar end 45 is selectively engageable with the teeth 46 to vary the angle formed by the bars 41 and 43 and the elevation of the pivot 44 relative to the arm 37, said pivot 44 being disposed parallel to the pivot 42. A chassis or frame engaging member 47 is supported by the bars 41 and 42 directly above the hinge joint 44. Said support member 47 includes an upper part in the form of a resilient pad 48, preferably formed of rubber and having a rounded upper surface.

The parts 29—48, previously described and as best illustrated in Figure 4, constitute one of four corresponding adjustable chassis or frame engaging supports 49, the chassis or frame engaging portion 48 of which can be adjusted longitudinally, laterally and vertically relative to the pit 8 for accommodating the support 49 to vehicle chassis or frames of different sizes and shapes. It will be obvious that the brackets 32 and parts carried thereby can be adjusted longitudinally of the plates 30 and thus longitudinally of the pit 8. The arm 37 can be swung in an arc of 360° about the axis of the rod 39 for moving the support member 47, inwardly, outwardly and longitudinally of the pit 8. Additionally, the bar end 45 will be adjustably positioned in different ones of the teeth 46 for varying the elevation of the support member 47 relative to the arm 37.

With the power units 15 and 16 extended, as illustrated in Figure 2, the hoist plates 17 will be disposed in substantially horizontal positions, as seen in Figures 1 and 2, for covering the pit ends 10 and 11 and with side edge portions of said plates 17 disposed in alignment with portions 9' of the floor 9, which portions 9' are disposed immediately adjacent the narrow intermediate portion 12 of the pit. The spacing between the wall portions 14 is less than the gauge or spacing between the front wheels and also between the rear wheels of a motor vehicle, while the spacing between the wall portions 13 of each pit end is greater than the spacing between the outer portions of the wheels and tires of either the front wheels or the rear wheels of a motor vehicle. Consequently, a motor vehicle can be driven either from right to left or from left to right to a position over the pit 8 so that either the front wheels or the rear wheels will move lengthwise over the floor portions 9' to position the front wheels on one of the hoist plates 17 and the rear wheels on the other hoist plate 17, as illustrated in Figure 2, wherein two wheels 50 of a vehicle are shown. The four chassis supports 49 can then be adjusted as previously described, longitudinally, laterally and vertically of the pit 8, for positioning the pads 48 of two of the support members 49, located at one side of the pit 8, beneath one side or sill of the vehicle frame or chassis 51, and the support members 47 of the other chassis supports 49 beneath the other frame side or sill. The fluid medium under pressure is then released in the lower ends of the cylinders 21 and may be supplied to the upper ends thereof for retracting the power units 20 to cause the hoist plates 17 to swing downwardly toward their dotted line positions of Figure 2. After a slight downward swinging movement of said plates 17, the chassis sills will come to rest upon the pads 48 so that the vehicle 52 will be supported entirely by said members 49 and with the wheels 50 free and unsupported, when the hoists 15 and 16 have assumed their fully retracted dotted line positions of Figure 2, in the ends of the pit 8. Thus, substantially the entire pit 8 will be available for use by mechanics working beneath the vehicle 52 and the pit ends 10 and 11 will afford ample access from below to all parts of the ends of the vehicle including the vehicle wheels.

Obviously, the pit 8 may be increased in length by lengthening the pit ends 10 and 11, which may also be increased in width.

If desired, an areaway 53 having steps 54 may open into one of the pit ends, as for example, the pit end 11, to provide ingress and egress to and from the pit 8 while a vehicle is disposed thereover. A plate 55, hinged at one end as seen at 56, may span the inner end of the areaway 53 so that a wheel 50 of the vehicle being driven onto or off of the pit cannot accidentally drop into the areaway.

It will be obvious that by extending the power units 20 the hoist plates 17 can be returned to their raised positions for elevating the vehicle 52 out of engagement with the supports 49 and so that the vehicle can be driven from a position over the pit 8.

Various modifications and changes are contemplated and may be resorted to, without departing from the function or scope of the invention as hereinafter defined by the appended claims.

We claim as our invention:

1. A vehicle servicing apparatus comprising an elongated pit including end portions and an intermediate portion, said end portions being wider than the intermediate portion and of a width greater than the gauge of the wheels of a motor vehicle, said intermediate pit portion being of a width less than the gauge of the wheels of a motor vehicle, each of said pit ends being provided with a hoist means including a plate disposed to substantially close the top of the pit end thereof when the plate is in a raised position, the front wheels of the vehicle being adapted to be supported by one of said plates and the rear vehicle wheels being adapted to be supported by the other plate, chassis engaging supports mounted in and extending upwardly from the intermediate pit portion and adapted to be disposed beneath parts of the vehicle chassis when the vehicle is supported by engagement of the wheels thereof with the hoist plates, and said hoists being retractable for displacing the plates downwardly out of engagement with the wheels and for positioning the chassis in engagement with the supports for supporting the vehicle over the pit.

2. A vehicle servicing apparatus comprising an elongated pit including end portions and an intermediate portion, said intermediate portion being of a width less than the width of said end portions and such that the wheels of a motor vehicle may straddle said intermediate portion in moving lengthwise of the pit, each of said end portions being provided with a hoist including a plate disposed at the top of the end portion thereof, in a raised position of the plate, said plates being of a size to be engaged simultaneously by either the front or rear wheels of the vehicle for supporting the vehicle above the pit when said hoists are extended, and chassis engaging supports mounted in and extending upwardly from said intermediate portion of the pit adapted to be disposed beneath parts of the vehicle chassis, when the vehicle is supported by said hoists, and for engaging the vehicle chassis to support the vehicle when the hoists are retracted for lowering said plates.

3. A vehicle servicing apparatus as in claim 2, means hingedly mounting each of the plates for swinging movement in said end portion downwardly and away from the intermediate portion, and each of said hoists including an extensible power unit having a lower end pivotally supported in said end portion and an upper end pivotally connected to an underside of the plate and remote from the axis of the hinge thereof.

4. A vehicle servicing apparatus as in claim 2, said plates being hingedly mounted at the ends thereof remote from one another for downward swinging movement in said end portions of the pit and in directions away from one another, each of the hoists including an extensible power unit having one end pivotally connected to an underside of the plate thereof, remote from the axis of the plate hinge, and an opposite end pivotally mounted in the end portion of the pit below the hinge of the plate.

5. A vehicle servicing apparatus as in claim 2, said intermediate pit portion including side walls, said chassis supports each including a bracket, means supporting two of said brackets on each of said pit walls for movement of said brackets longitudinally of the pit, each of said supports including a part adapted to engage the chassis, and means for supporting said part for swinging movement relative to the bracket for adjustment of said chassis engaging part, relative to the bracket, both longitudinally and laterally of the pit.

6. A vehicle servicing apparatus as in claim 5, and means, forming a part of said last mentioned means, for raising and lowering the chassis engaging part relative to the bracket.

7. A vehicle servicing apparatus as in claim 2, said intermediate portion including side walls, said chassis supports each including a bracket, means for mounting a plurality of said brackets on each of said side walls for individual adjustment of the chassis supports longitudinally of the pit, and each of said chassis supports including a chassis engaging element, and each of said chassis supports including means connecting the element thereof to the bracket of said support for adjusting the position of said element relative to said bracket longitudinally, laterally and vertically relative to the pit.

No references cited.